United States Patent [19]

Constance

[11] Patent Number: 5,067,275

[45] Date of Patent: Nov. 26, 1991

[54] HYDROPONIC GARDEN

[76] Inventor: Gerald D. Constance, 7225 Warren Rd., Ann Arbor, Mich. 48105

[21] Appl. No.: 482,889

[22] Filed: Feb. 22, 1990

[51] Int. Cl.$^5$ ............................................. A01G 31/00
[52] U.S. Cl. .............................................. 47/62; 47/59
[58] Field of Search .................................. 47/59, 62, 63

[56] References Cited

U.S. PATENT DOCUMENTS

| | | | |
|---|---|---|---|
| 3,300,895 | 1/1967 | Dosedla et al. | 47/62 |
| 3,352,057 | 11/1967 | Ferrand | 47/62 |
| 3,660,933 | 5/1972 | Wong, Jr. | 47/62 |
| 4,211,034 | 7/1980 | Piesner | 47/62 |
| 4,255,896 | 3/1981 | Carl | 47/62 |
| 4,302,906 | 12/1981 | Kawabe et al. | 47/62 |
| 4,310,990 | 1/1982 | Payne | 47/59 |
| 4,324,069 | 4/1982 | Flagg | 47/62 |
| 4,334,386 | 6/1982 | Burcombe | 47/62 |
| 4,669,217 | 6/1987 | Fraze | 47/59 |
| 4,813,176 | 3/1989 | Takayasu | 47/59 |

Primary Examiner—David A. Scherbel
Assistant Examiner—Linda J. Watson
Attorney, Agent, or Firm—Harness, Dickey & Pierce

[57] ABSTRACT

A hydroponic garden utilizing conventional flower pots for growing chambers and a plastic PVC pipe supporting the flower pots through openings in the upper wall of the pipe so that a nutrient solution circulating through the plastic pipe feeds the plants growing in the flower pots. A timer controlled pump circulates the nutrient solution from a reservoir through the conduit and back to the reservoir according to a predetermined program.

7 Claims, 1 Drawing Sheet

HYDROPONIC GARDEN

BACKGROUND AND SUMMARY OF THE INVENTION

The present invention relates to a hydroponic garden and in particular to a hydroponic garden utilizing readily available materials to enable construction of a small garden for private use that is relatively low in cost to be affordable to the home gardener.

Hydroponic gardening is the growing of plants in nutrient solutions with or without an inert medium to provide mechanical support for the plant. When grown hydroponically, plants will flourish in a manner superior to the manner in which they are grown in a normal soil medium. This is due to the fact that the plants do not have to develop the expansive root systems that they normally do in soil to absorb the necessary food. Further, the root systems are not compelled to grow or plow through a dense soil medium in order to find food and water as they would in a normal soil medium. In utilizing a hydroponic growing technique, the plants begin growth very quickly and grow faster than they would in a soil medium and ripen earlier. Additionally, with hydroponic gardening, the plants require less space in which to grow due to the fact that their feeding and root structures are not contained, thereby permitting the plants to feed and breath much more easily than they could in soil.

Numerous commercial hydroponic gardening systems have been developed. However, many of these systems use specialized components that are not readily available, resulting in a high cost system that is not affordable by a home gardener. For instance, many hydroponic gardening systems use specialized growing chambers for the plants that are adapted specifically for use with a given hydroponic garden. These often contain separate water inlets and outlets and may even include water distribution tubes therein. These growing chambers must often be used with specialized troughs or channels through which the nutrient solution is circulated. The troughs or channels may also contain smaller tubing therein for conveying the nutrient solution. Gardening systems with these specialized components may be affordable by commercial growers who derive an income from their produce but are often too expensive for the home gardener.

It is an objective of the present invention, therefore, to provide a hydroponic garden utilizing readily available components to reduce the cost of the garden.

The hydroponic garden of the present invention utilizes conventional flower pots having an aperture in the bottom wall for the plant growing chambers. The flower pots are supported in openings in the top wall of a plastic conduit that is intermittently filled with a nutrient solution which surrounds the flower pots and fills them through the bottom wall aperture. The nutrient solution is stored in a reservoir between watering cycles and is intermittently pumped into the conduit by a pre-programmed timer.

The garden can be made as large or as small as desired by the gardener. Hydroponic gardening is particularly suited for persons living in apartments who do not have the space or ground in which to plant a garden. It is an advantage of the garden of the present invention that the garden can be incorporated into a deck railing, or placed on a table that can be easily moved for proper sunlight or in the event of a frost.

Further objects, features and advantages of the invention will become apparent from a consideration of the following description and the appended claims when taken in connection with the accompanying drawings.

DETAILED DESCRIPTION OF THE DRAWINGS

Figure 1:
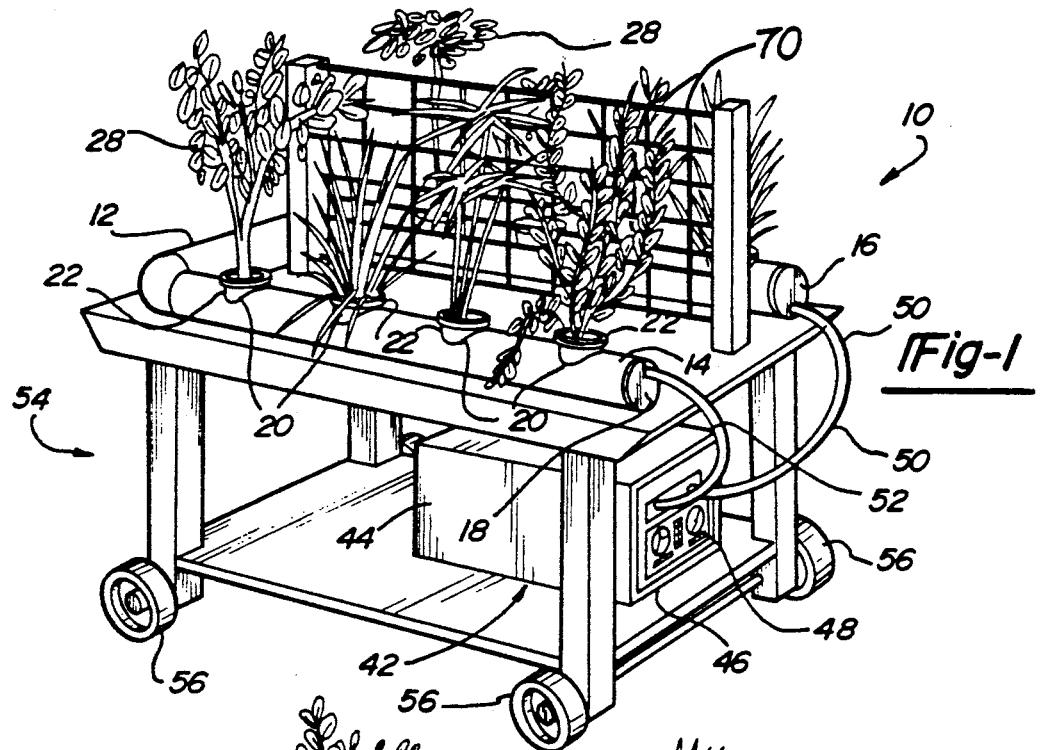
FIG. 1 is a perspective view of the hydroponic garden of the present invention supported on a movable table.

The hydroponic garden of the present invention is shown in the figures and designated generally as 10. Garden 10 includes a conduit 12 which, in FIG. 1, is generally U-shaped. Conduit 12 is an enclosed conduit with a top wall 14 and two end closure caps 16 and 18. In the preferred embodiment shown, conduit 12 is constructed of a plastic pipe, such as PVC. PVC is preferred due to its low cost and ready availability in various sizes. However, other materials or shapes can be used as conduit 12. The top wall 14 of conduit 12 has a number of openings 20 therethrough. Plant growing chambers 22 are inserted into each of the openings 20 and contain a quantity of a chemically inert material 24 such as vermiculite or pearlite. The inert material 24 provides mechanical support to the roots 26 of plants 28.

In the preferred embodiment, the growing chambers 22 are conventional flower pots having an upright side wall 30 and a bottom wall 32. The bottom wall of the flower pots contains at least one aperture 34 to enable the nutrient solution to fill the growing chambers as will be described in more detail below. Conventional flower pots are used as the growing chambers in place of specialized growing chambers used in many hydroponic gardens. The growing chambers are shaped and sized so that they are supported by the top wall of the conduit in a position in which the bottom walls 32 of the chambers are spaced from the bottom wall 40 of the conduit. Preferably the growing chambers include a radially projecting lip 38 near their open top ends that engages the top wall 14 of the conduit to support the chambers therein.

Garden 10 includes a pump and a reservoir assembly 42 which is shown as an integral unit. The pump and reservoir can, however, be separate units connected by appropriate tubing. The reservoir portion 44 of assembly 42 holds a quantity of a plant nutrient solution sufficient to fill the conduit 12 as described below. The nutrient solution is specifically formulated to supply the needs of the particular plants 28 being grown. The pump portion of the assembly 42 includes a pump 46 for the nutrient solution which is controlled by a timer 48. A fill and drain tube 50 is connected at one end to the pump outlet and at the other end to the conduit closure cap 16 at a position near the conduit bottom wall 40. An overflow tube 52 is connected at one end to the reservoir 44 and at the other end to the closure cap 18 near the conduit top wall 14.

In operation, the timer 48 will be set to actuate the pump for a predetermined length of time one or more times during a given day. When the pump is actuated, the nutrient solution is pumped from the reservoir into the conduit 12. Once the conduit is filled with the nutrient solution, excess solution will drain through the overflow tube 52 back into the reservoir. As the pump continues to operate, the nutrient solution is circulated through the conduit 12. The overflow tube 52 is connected to the conduit near the top wall 14 so that the conduit 12 will be substantially filled with the nutrient solution. When the conduit fills, the aperture 34 in the bottom wall of the growing chambers 22 enables the nutrient solution to enter the growing chambers and nourish the plants 28.

When the timer 48 stops the pump, the nutrient solution in conduit 12 drains through tube 50, the pump 46, and back into the reservoir 44. The nutrient solution in the growing chambers 22 also drains through the bottom apertures 34, emptying the chambers. When the nutrient solution has drained from the chambers, air is allowed to reach the plants roots to provide needed oxygen.

By utilizing a separate growing chamber 22 for each plant, a diseased plant can be easily replaced with a new plant without disturbing adjacent plants. With a growing chamber placed in each opening 20 the conduit 12 is closed blocking direct sunlight from the nutrient solution to reduce evaporation and prevent bacteria growth.

The interior of conduit 12 is free from tubing, inert material, etc., which would impede nutrient solution flow. The conduit 12 is used to directly supply the nutrient solution to each growing chamber 22 and also to support the growing chambers. When the conduit 12 is filled with the nutrient solution, the growing chambers 22 are substantially submerged in the solution so that the solution will fill the chambers to the height of the overflow tube 52.

The hydroponic garden 10 in FIG. 1, is supported on a table 54 so that the plants are at a convenient height to work on without the need to bend or kneel. Table 54 includes a trellis 70 to support the plants. The table 54 is equipped with wheels 56 that enable the table and hydroponic garden 10 to be moved if necessary. The table can be moved to provide optimal sunlight as the position of the sun changes during the year. Furthermore, the entire garden can be moved indoors in the case of an untimely frost or to grow plants indoors during winter.

Figure 2:
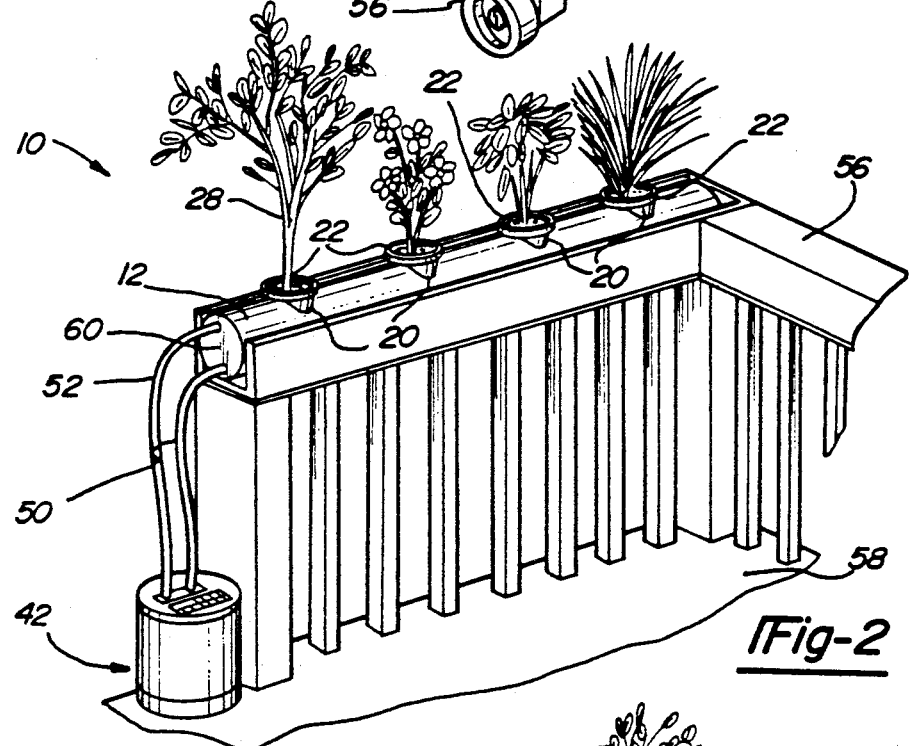
FIG. 2 is a perspective view of the hydroponic garden of the present invention incorporated into a railing.
Figure 3:
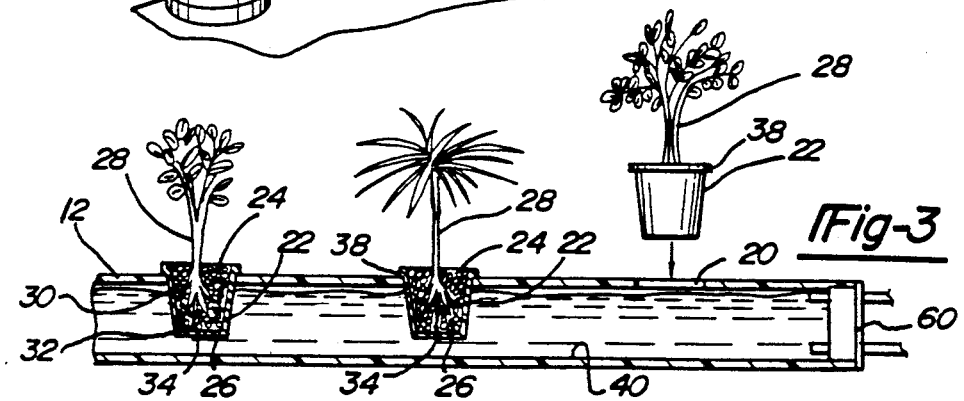
FIG. 3 is a cross-sectional view through the nutrient solution conduit and growing chambers.

In the embodiment shown in FIG. 2, the garden 10 is incorporated into a railing 57 around the periphery of a deck 58. The pump and reservoir assembly 42 is shown at one end of the railing but can be enclosed in a wooden structure matching the deck construction to hide it from view. In this embodiment, the conduit 12 is a single straight tube. Both the fill/drain tube 50 and the overflow tube 52 are fitted to the closure cap 60 at one end of the conduit rather than at opposite ends. The positions of tubes 50 and 52 relative to the top and bottom walls of the conduit are the same as in FIG. 1. Any longitudinal shape of the conduit, straight, U-shaped or otherwise, can be used without departing from the scope of this invention.

The hydroponic garden of the present invention is made of readily available materials so as to reduce a cost of the garden to be affordable to the home gardener. This is a significant advantage over present hydroponic gardening systems which utilize specialized equipment and are primarily adapted for commercial growers. The garden uses conventional flower pots for growing chambers and supports the pots in a conduit of PVC tubing through which the nutrient solution is circulated. Specialized growing chambers with internal nutrient solution distribution tubes are not needed. The complexity of the garden, in terms of the number of individual components, is also reduced. The present garden can be made as large as desired by the gardener. Additionally, the size of the garden can be expanded by the use of additional conduit along with appropriate fittings to connect the added conduit to the already existing garden.

It is understood that the invention is not limited to the exact construction illustrated and described above, but that various changes and modifications may be made without departing from the spirit and scope of the invention as defined in the following claims.

I claim:

1. A hydroponic garden, comprising:

a closed conduit having an upper wall with spaced openings therethrough;

a plurality of plant growing chambers, one chamber for each of said openings, said chambers having a side wall and a bottom wall and being open at the top of said side wall, said chambers further having an aperture through said bottom wall, said chambers being placed in said openings in said conduit to support said chambers therein;

means for periodically filling said conduit with a plant nutrient solution to a level above the bottom wall of said chambers and for draining said nutrient solution from said conduit, said filling and draining means includes a reservoir for said nutrient solution disposed at an elevation below said conduit, pump means in fluid communication with said reservoir, a fill tube coupled at one end to said pump means outlet and coupled at the opposite end to said conduit at a level below the bottom walls of said chambers and an overflow tube coupled at one end to said conduit at a level above the bottom walls of said chambers and routed downwardly therefrom to said reservoir whereby when said pump means is operated nutrient solution flows into said conduit from said fill tube raising the level of nutrient solution in said conduit to the level of said overflow tube after which nutrient solution flows through said overflow tube back to said reservoir and after said pump means is stopped, nutrient solution drains from said conduit through said fill tube and pump means back into said reservoir to lower the nutrient solution level in said conduit to the level of said fill tube therein.

2. The garden of claim 1 further comprising a timer to actuate said pump means.

3. The garden of claim 1 wherein said plant growing chambers are conventional flower pots.

4. The garden of claim 1 further comprising means for supporting said conduit above ground level.

5. The garden of claim 4 wherein said support means includes a portable table to enable said garden to be moved.

6. The garden of claim 1 wherein said conduit is integrally constructed with a deck railing.

7. The garden of claim 1 wherein said conduit is constructed of PVC pipe.

* * * * *